Jan. 14, 1969    J. A. GANS    3,421,498
VISUAL FIELD TESTER
Filed June 25, 1963    Sheet 1 of 5

INVENTOR.
JEROME A. GANS
BY
*Fay & Fay*
ATTORNEYS

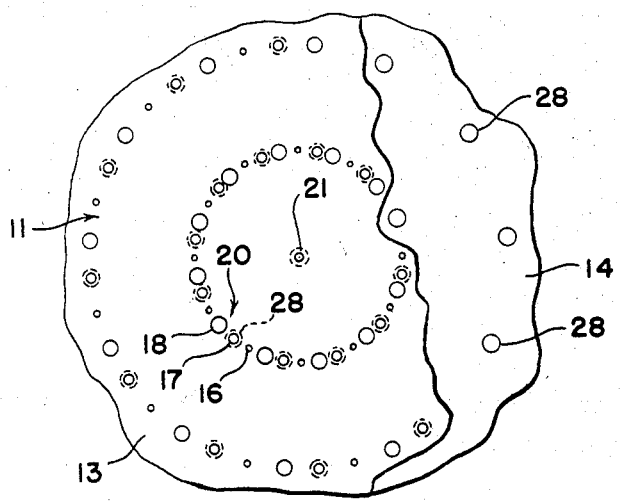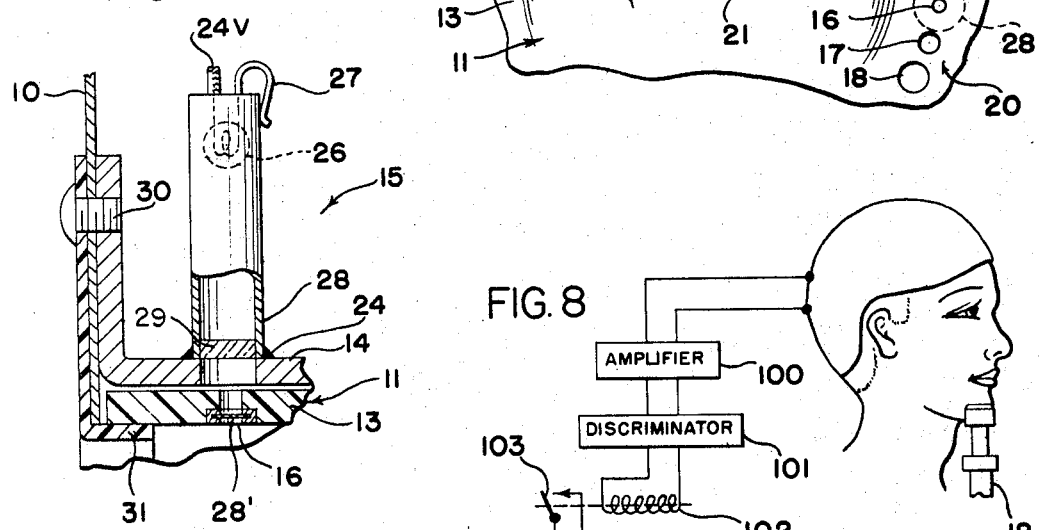

INVENTOR.
JEROME A. GANS
BY
*Fay & Fay*
ATTORNEYS

VISUAL FIELD IN A BRAIN LESION

VISUAL FIELD IN A BRAIN LESION

INVENTOR.
JEROME A. GANS
BY
Fay & Fay
ATTORNEYS

Jan. 14, 1969   J. A. GANS   3,421,498
VISUAL FIELD TESTER
Filed June 25, 1963   Sheet 5 of 5

INVENTOR.
JEROME A. GANS
BY
Fay & Fay
ATTORNEYS

United States Patent Office 3,421,498
Patented Jan. 14, 1969

3,421,498
VISUAL FIELD TESTER
Jerome A. Gans, Shaker Heights, Ohio
(420 Osborn Bldg., 1020 Huron Road, Cleveland, Ohio)
Continuation-in-part of application Ser. No. 34,512,
June 7, 1960. This application June 25, 1963, Ser.
No. 290,484
U.S. Cl. 128—2.1                               10 Claims
Int. Cl. A61b 3/00; A61b 5/04; A61b 3/02

This application is a continuation-in-part of my prior copending application, Ser. No. 34,512, filed June 7, 1960, and now abandoned.

This invention is directed to an automatic self-recording visual field tester in general, and more specifically is directed to a device to be used in connection with the practice of visual field study, to effectively and accurately ascertain the boundaries of the field of vision of a patient. The results which are automatically recorded may be examined by an ophthalmologist to aid him in diagnosing diseases of the eye, optic nerve and brain.

In its broadest sense, the instant invention includes a screen having a series of apertures through which lights are selectively shown. The patient fixes his eye at the center of the screen or fixation point, and as the lights are selectively lighted, the perimetric field of vision may be checked. Suitable means, such as a hand operated switch or an electroencephalograph, are provided to indicate the patient's response to vision, with no response required for no vision. An automatic recorder is provided which accurately records the patient's response on a chart, thereby permitting the ophthalmologist to examine the field of vision from the chart.

More specifically, two types of screens are provided, a hemispherical screen and a tangent screen. The former is primarily used for checking peripheral visual fields with the latter being particularly suited to measure the diameters of the blind spot formed by the optic nerve where it enters the eyeball as well as defects of the central field. The novel circuit illustrated herein may be programmed for either screen.

Present day techniques dictate that the visual field shall be checked by the ophthalmologist or his assistant positioning the light or a target on a marked screen and noting the patient's oral response on a chart. This is a time-consuming job which is eliminated when the present invention is utilized. The present invention allows visual fields to be checked by the patient, after he is given a short period of instruction on the machine, and thereafter he may successively check his own visual field, requiring only for the ophthalmologist to study the record made by the recording means and render advice based on his findings.

In some instances, because of speech defects, or the lack of intelligence to respond, in the past, it became necessary for a visual check to be made by rather crude standards compared to those set forth herein. The present invention envisions the use of an electroencephalograph, whereby no oral or manual response is required of the patient. In order to do this, reliance is placed upon the alpha rhythm waves in the patient's brain, and means are provided to distinguish between an affirmative or negative response, either by frequency, magnitude, or both. The alpha rhythm waves may be amplified and discriminated against, in order to obtain the affirmative or negative response indicating that the patient sees the light or does not see it.

Several prior art devices have been proposed to solve the problems noted, but have been unsatisfactory for one reason or another. In order to accurately determine the visual field, the lights must be at spaced intervals on great circles emanating from the central fixation points. Furthermore, it is highly desirable to have the lights zigzag across the radius lines from fixation in order that certain diseases of the eyes may be detected. The prior art has been deficient in that visual testers heretofore proposed fail to provide the necessary structure to facilitate accurate testing and hence have not been accepted medically.

The field tester herein disclosed provides an automatic pulsing circuit which provides electrical energy for a short duration, for example, one-tenth of a second or more. An adjustable time lag is provided between pulses in order to enable the patient to respond if a response is forthcoming. A series of switches which are automatically stepped, feed the pulses to the lights in a zigzag pattern across the various radii as programmed. The lights are programmed from the outer periphery or no vision into the area of vision in order to obtain an accurate chart delineating the field of vision. As the pulser transmits the short bursts of energy, the switch moves through each series of lights, as well as simultaneously moving a switch through a second series of contacts which is hooked into a recorder. Upon the patient indicating response, it is noted on the recorder in the same relative position as the light responded to, thereby setting forth the visual field in a graphic manner. When the visual tester is once started, it automatically proceeds through each bank of lights until the visual field is completely checked, unless for some reason it is desirable to reset and start over. In the latter case, suitable means are provided to enable one to reset and restart immediately. This enables the ophthalmologist to study the recorded field at his leisure, at which time he may ascertain whether the field is normal, abnormal, or whether further testing is necessary.

A clearer understanding of the instant device will become apparent when the objects to be achieved thereby are given.

It is, therefore, an object of this invention to provide a new and improved automatic self-recording field tester.

It is a further object of this invention to provide a new and improved field tester which may be automatically or manually responded to by the patient.

It is a still further object of this invention to provide a novel circuit to facilitate the automatic selective energization of the lights at the proper intervals.

It is a still further object of this invention to provide suitable means to enable selection of the size of aperture and for color of the light which passes therethrough.

It is a still further object of this invention to provide automatic means to record the patient's response, whether the response is automatic or manual.

It is a further object of this invention to provide a visual field tester which, due to its unique circuitry and simplified design, is economically feasible to manufacture.

It is a further object of this invention to provide a visual field tester which would permit exceedingly accurate recordation of the patient's response to vision or lack thereof.

It is a further object of this invention to provide a hemispherical screen in a visual field tester in order to enable a high degree of accuracy to be obtained in the testing of perimetric vision.

It is a further object of this invention to provide an automatic visual field tester which will provide flexibility of programming thereby allowing the operator to program circularly, radially outside in, radially inside out, random pattern, scatter pattern and the like.

Further and fuller objects will become readily apparent when reference is made to the accompanying drawings, wherein:

FIG. 4 is a fragmentary front view taken around the fixation point with a portion of the inner bowl removed;

FIG. 5 is a fragmentary view similar to FIG. 4 showing the detail of the different size apertures;

FIG. 6 is an enlarged view of one of the lights shown in the manner in which it is connected to the outside bowl;

FIG. 8 is a schematic representation of an electroencephalograph, illustrating how it would be connected into the circuit of FIG. 7;

Figure 1:
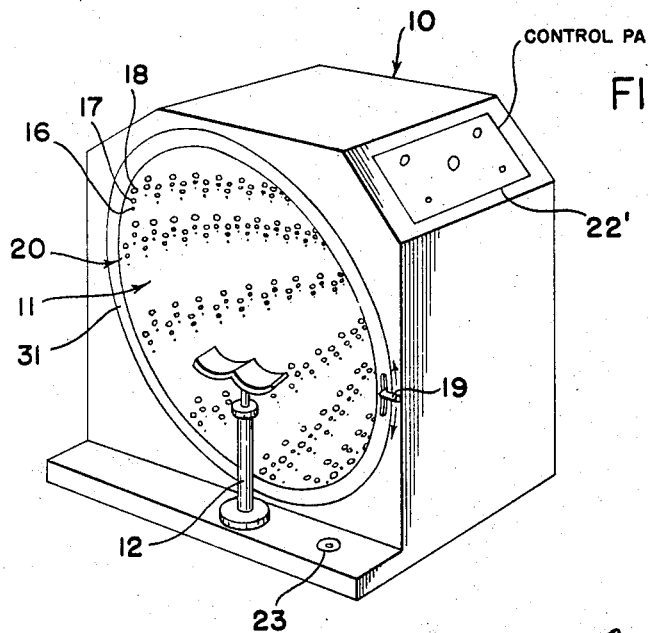
FIG. 1 is a schematic representation of a visual field tester utilizing a hemispherical bowl as a screen.
Figure 3:
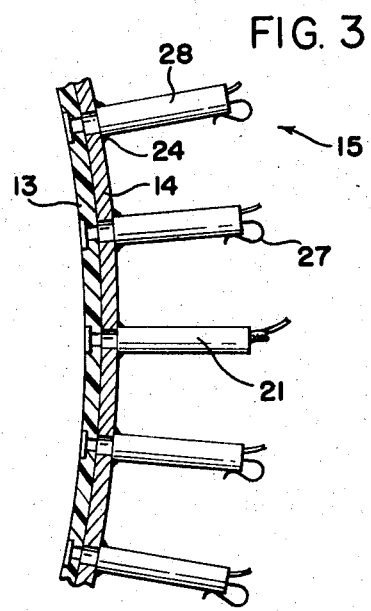
FIG. 3 is an enlarged fragmentary view, in section, of the hemispherical bowls.
Figure 2:
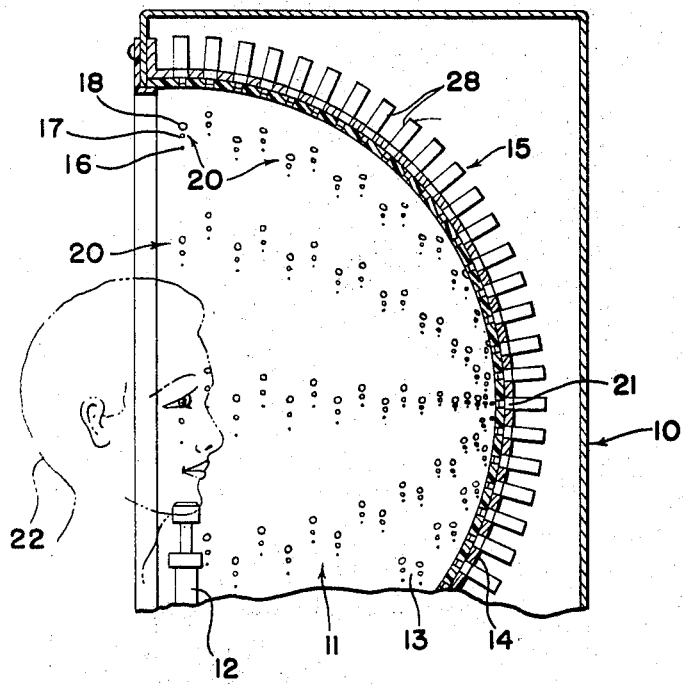
FIG. 2 is a center-cut, cross-sectional view through the field tester of FIG. 1.

Referring to FIGS. 1–3 of the drawings, therein is shown a schematic representation of the device embodying a cabinet 10, having a screen 11, and adjustable chin rest 12. As is more clearly seen in FIGS. 2 and 3, the screen is composed of a pair of interfitting bowls 13 and 14, fabricated from a suitable conductor, such as metal. The bowl 14 is provided with a series of lights indicated generally at 15 which are wired into the circuit to be selectively energized according to a prearranged pattern or program. The inner bowl 13 is provided with groups 20 of apertures 16, 17 and 18. Each group 20 is positioned approximately along a latitudinal axis of the inner bowl 13 in such a fashion that upon the rotation of inner bowl 13 relative to outer bowl 14 about an axis of rotation approximately through fixation point 21, a preselected one of the apertures 16, 17 or 18 of inner bowl 13 overlies the aperture of the lights 15 of outer bowl 14. A handle 19 is connected to the bowl so that the apertures 16, 17 or 18 may be selectively rotated about an axis approximately through the fixation point 21 to be coaxial with the aperture admitting light in the outer bowl 14. The groups 20 are arranged along great circles of the hemisphere in a zigzag pattern back and forth across the great circles to the fixation point indicated generally at 21. Correspondingly, the plurality of apertures for lights 15 on the outer bowl 14 are likewise arranged in a corresponding zigzag pattern along great circles of the outer hemisphere to the fixation point 21 so that the preselected one of the apertures 16, 17 or 18 will accordingly overlie the corresponding aperture 15 in the aforementioned zigzag pattern. As more clearly seen in FIG. 2, the patient is shown schematically at 22 as having his chin supported by a chin rest 12 and the right eye directed at the fixation point 21. The lights are energized generally but not necessarily from the outer periphery of the hemisphere towards the fixation in a zigzag pattern. As will become apparent hereinafter, any selected program of light may be obtained. A control panel 22' may be provided in the case 10 so that the machine may be energized and adjusted readily, without interfering with the patient. A patient response switch may be carried as at 23, or may be provided on a pigtail to be held in the patient's hand, or may be a foot switch, depending upon the desires of the manufacturer. The sockets or holders 28 for the lights include copper or similar conducting metal tubes positioned in the outer bowl 14 as by brazing, as at 24, or other suitable method of fastening which would ground the sockets to the metal bowl. As more clearly seen in FIG. 6, a lamp 26 is inserted in the socket and retained by a clip 27, which completes the circuit, utilizing the socket for common or ground, eliminating considerable wiring. A plastic filter 29 fabricated from suitable material, such as sold under the trademarks Teflon, nylon, or the like, is provided in the socket to reduce the intensity and brightness of the lights to medically accepted standards. A colored filter may be inserted in any or all of the apertures as shown at 28' in FIG. 6.

The arrangement of the groups 20 is more clearly seen in FIGS. 4–6, as containing openings varying in size and/or color. For example, in one concrete embodiment, the aperture 16 may be one millimeter and clear, the aperture 17 may be three millimeters and red, and the aperture 18 may be five millimeters and clear. Rotation of the bowl in the direction of the arrows brings the selected opening into alignment with the inner diameter of the light receiving socket 28. Obviously, the socket 28 must be of a minimum diameter equal to the size of the largest aperture; in the present case, the aperture 18. The apertures may be zigzagged a few degrees on either side of a radius emanating from the fixation point 21 in order to more accurately check against those diseases of the eye which narrow the field of vision in azimuth, but do not effect it in elevation, or vice versa. As heretofore noted, rotation of the bowl brings all of the apertures 16 into alignment with corresponding light sockets 28. The construction enables the person setting up the test to select the size of aperture best suited for the test to be conducted.

As shown in FIG. 6, aperture 16 is positioned coaxially with the light holder 28 so that light may pass therethrough. The outer bowl 14 is fastened to the casing 10 by suitable means, such as a bolt 30, fitting in a tapped hole in the hemisphere. Other forms of fastening may be equally suitable. The inner bowl 13 is slidably received within the flange 31 so that the bowl 13 may be rotated with respect to the bowl 14, with the fixation point providing the central axis of rotation. Anti-friction means could be interposed between the bowls to insure ease in relative rotation therebetween.

Figure 10:
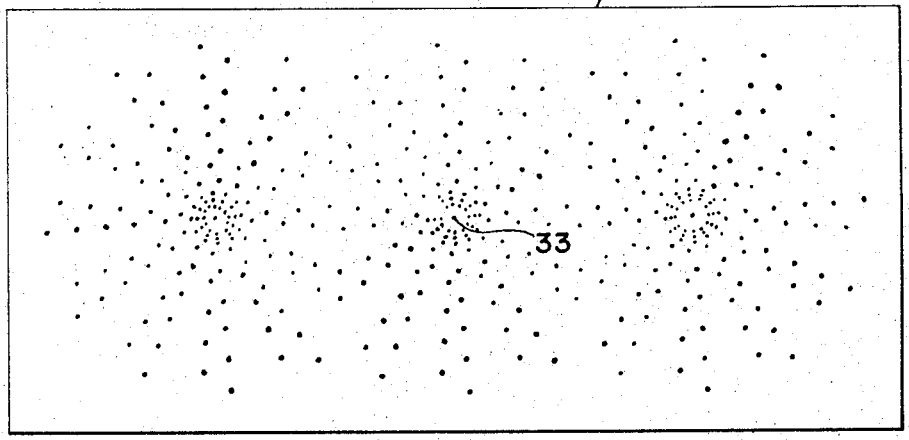
FIG. 10 is an elevational view of a tangent screen.

A flat or tangent screen is shown in FIG. 10, with a fragmentary portion of the lights indicated by the black dots. The tangent screen is particularly useful in checking for diseases such as glaucoma. The hemispherical screen is particularly suited for tests to detect neurological diseases. The tangent screen 32 has the apertures arranged in a zigzag pattern across the radii emanating from the central fixation point 33. Each of the positions on the screen where the blind spot for the right and left eye would fall is provided with a special series of apertures, in order that the size of the optic nerve, where it enters the eye, may be plotted. This will be more fully discussed later when the operation of the field tester is described.

Figure 7:
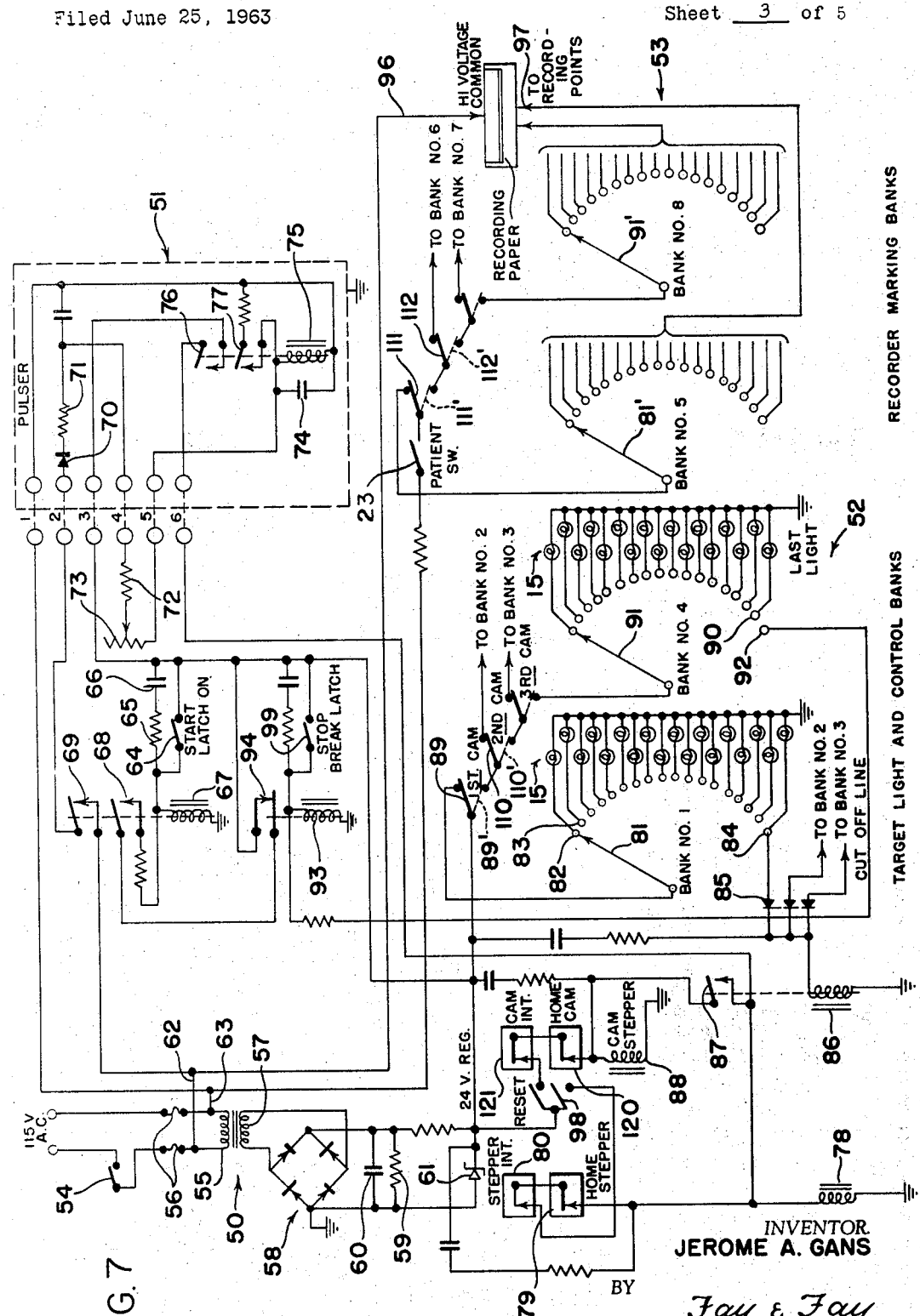
FIG. 7 is a schematic diagram of the circuit utilized in conjunction with the visual field tester of FIG. 1 and tangent screen of FIG. 10.

A novel circuit is shown schematically in FIG. 7, which has built-in flexibility so that it may be used in the flat or tangent screen and the hemispherical screen with no modification, other than the programming of the lights to insure they will be selectively energized in the proper order. The schematic diagram of FIG. 7 contains four major components, including a power supply indicated generally at 50, a pulser indicated generally at 51 (delineated by the dotted lines), a target light and control bank 52, and a recording section 53 with its associated control bank.

The power supply 50 may be connected to a 115 volt A-C source as is commonly found in the home, office, factory, or the like. A switch 54 is provided in one side of the line leading to the primary of a transformer 55. Fuses indicated at 56 may be provided in the line to take care of overload, shorts and like contingencies. The secondary of the transformer is indicated generally at 57 and provides a 26 volt A-C supply being stepped down from 115 volts. A diode bridge 58 is provided to obtain full wave rectification of the stepped down voltage. The rectified voltage is filtered through an RC network indicated at 59 and 60, respectively, with the filtered D-C being regulated by a Zener diode 61 to supply 24 bolts to the various components.

A 115 volt source voltage is tapped ahead of the primary of the transformer by leads 62 and 63 which supply power to the pulser and to the recording section. These will be described in greater detail hereinafter.

The start and stop circuits include relays which operate contacts connected in the 24 volt source, as well as a separate set of contacts for the 115 volt source. The start switch is indicated at 64 having a resistor 65 and capacitor 66 in parallel therewith. The start switch 64 is spring biased and will open when released. Depression of the start switch supplies energy to the relay 67, causing the contacts 68 and 69 to close. Contacts 68 form a holding circuit for the relay 67, keeping it energized after release of start switch 64. Contacts 69 are connected to the 115 volt source and supply power through diode 70 and resistor 71 to provide half wave rectification for the input to the pulser. The current flows through the diode 70, resistor 71, and resistor 72, and variable resistor 73 to capacitor 74, resistor 73 and capacitor 74 constituting an RC time delay network. After a predetermined length of time, the voltage across relay 75 will build up sufficiently to energize the relay 75, thus closing contacts 76 and 77. The length of time delay may be determined by adjusting the resistance value of variable resistor 73. Contacts 77, upon closing, will discharge the charge in the RC time delay network, causing relay 75 to be deenergized, thus opening the contacts 76 and 77. However, before the opening of the relay 75, contacts 76 will supply filtered 24 volt D-C to the stepper relay coil 78 which operates the stepping switch to a new position. A 24 volt D-C will be supplied through contacts 76 to the stepper coil indicated at 78, energizing the relay to open normally closed switch 80, for the duration of the pulse. The opening of switch 80 is without effect since it is in the resetting circuit to be later described. When relay 78 is deenergized by the opening of relay 75, due to the discharge of the voltage across relay 75, the switch 81 in bank 1 is stepped to the next position and the switch 81' in bank 5 is stepped to the corresponding position.

With each electrical pulse by the pulser, the stepper coil will be energized for a short period, which serves to move angularly moving switches 81 and 81' to a new contact, such as those shown at 82, 83, etc. Each of the contacts is connected to a lamp which is positioned in the sockets shown and connected to ground. Engagement of the contact causes the lamp to come on while the switch 81 is in contact. Obviously, the lamps may be positioned on the screen in any pattern desired, and programming arrangements as a plug board, terminal strip, or the like, may be provided to facilitate ease in arrangement of the sequence of the lights. Similarly interchangeable punch cards may be used to vary the programming in the same instrument without changing wiring.

Upon the switch 81 reaching the final contact 84, the electrical energy is conducted from terminal 84 through diode 85 to relay 86, which when energized operates switch 87 to energize the cam stepper relay 88. Upon energization of the cam stepper 88, the first cam switch 89 in the target light and control bank 52 is moved to the position shown in dotted lines 89' so that power is supplied to the second bank through second cam switch 110. Simultaneously with the movement of switch 89 to the position at 89', the switch 111 in the recorder marking banks moves to the position indicated in dotted lines 111'. Thus, it can be seen that a corresponding recorder marking bank is provided for each of the target light and control banks, with each of the leads on the recorder marking bank going to the same relative position on the recorder as the light on the screen. When the patient switch 23 is closed, indicating that the patient has seen the energized light, the circuit is completed through the proper lead in the proper bank to pass a spark through the chart paper leaving a mark about the size of a pin hole for later reference.

The operation resumes through the second bank with the stepper moving a switch arm similar to arm 81 through the respective positions until at the last position the cam stepper is again energized. The cam stepper then moves the second cam switch 110 to the position indicated in dotted lines at 110', as well as moving the corresponding recording marking bank cam switch 112 to the position shown in 112'. The stepper 78 continues when each of the cam switches is moved to the position shown in dotted lines. The corresponding bank is deenergized, cutting off the power through the last light 84 to relay 86, causing contact 87 to open deenergizing the cam stepper. Simultaneously with the actuation of the cam stepper, the stepper coil has been energized to move the switch 81 to the starting position. Each of the relays 78, 86 and 88 is provided with a capacitor and resistor in series from the 24 volt source connected thereto to eliminate sparking of the contacts when they open and close under applied voltage. The operation continues through each of the respective banks with banks 1 and 5 operating as a unit, as well as banks 2 and 6, banks 3 and 7, and banks 4 and 8. Upon the moving switch reaching the last contact position indicated at 92, the machine automatically stops as will be described. For convenience, only the first and last bank, indicated as bank No. 1 and bank No. 4, respectively, are shown; however, any number of banks may be included, depending upon the number of lights desired. Upon energizing the last light of the last bank, indicated at 90, the switch 91 is moved by the next pulse to terminal 92 which energizes the cut-off line, thus energizing relay 93. Relay 93 opens contacts 94 cutting off the supply to the pulser and bringing all switches to the starting position.

Resetting of the machine may be accomplished at any time. In order to accomplish resetting, a reset switch 98 is provided, which when closed supplies energy to the cam stepper 88 and the stepper relay 78 through self-interrupter switches in series with a homing switch. Each of the individual relays will move the cam switches and the stepper switches, respectively, through their respective positions. Upon reaching the starting place, the cam has a home position which opens home cam switch 120. Similarly, a home position is provided on the cam which opens home stepper 79. It can be seen that opening of these contacts deenergizes the cam stepper 88 and the stepper relay 78 serving to deenergize the circuit in the home position which is the position shown in the drawings.

As hereinbefore noted, each time the cam stepper coil 88 and stepper coil 78 are energized, the respective switches 121 and 80 open. Since on resetting these switches are in series with the voltage source supplying the relay coils, they will break the circuit and the relay will be deenergized returning the switches to the closed position as shown, whereupon the cycle will again repeat. When the home position is reached, the home cam opens switches 79 and 120 which are also wired in series, leaving the circuit in the start position shown in the drawings.

The stepper interrupter, home stepper, home cam and cam interrupter switches may take varied forms well known in the electrical arts, such as the stacked switches formed of conducting blades and operated to the open or closed position by a cam mechanism, which is moved through a ratchet type mechanism to rotate the cams to perform the switching function. If, at any time during the test, the patient sees a light, the patient switch 23 is closed supplying high voltage through the proper terminal in the recording bank in use to the recording plate. Lead 96 from the 110 volt supply is positioned over a suitable type of conducting recording paper.

Upon completion of the circuit through the terminal in the bank by closing the patient switch, the voltage arcs from the high voltage common through the recording paper to the recording point, which is appropriately positioned on the paper to correspond with the position of the light on the screen. The paper has a small pin hole burned therein which is easily seen by the naked eye, so that field of perimetric vision may be ascertained by merely observing the dots when the test is complete. It is to be emphasized that the lights may be arranged in any particular pattern, scattered, random, etc., so that they may be energized along any particular great circle in a sequence emanating from the outer perimeter of the bowl towards fixation or vice versa. When used with the tangent screen, the lights may be programmed to operate in an area of no vision proceeding outward to vision or vice versa. The former is the generally accepted method of testing since it is highly desirable for one to proceed from no vision to vision in order to obtain highly accurate results in the test.

In the event the patient is unable to respond manually by depressing the button, such as would be true in the case of people lacking coordination to respond, automatic means are provided so that the patient's thought processes will be recorded if the response is negative or positive.

Indicated diagrammatically in FIG. 8, the scalp of the person over the occipital area is coated with a conductive standard paste and electroencephalographic leads which are positioned on the occipital lobes. The contact can be made in a better conducting fashion by the use of the paste. The electroencephalographic leads may be enclosed in a rubber cap so that they may be positioned and held in place.

The leads are connected to an amplifier which has a high amplification, for example, 3,000 times its input. The amplifier has been shown in block diagram from since it may take the form of any one of a number which are available on the open market.

The output of the amplifier 100 is connected to a discriminator 101 which in turn has its output fed to a relay 102. The relay operates switch 103 which is placed in parallel with the patient switch 23. It is known that alpha rhythm waves in the human brain are similar to a sine wave and have a frequency of about 8 to 12 cycles per second when no vision is present. When light is detected, the alpha rhythm waves approximately double in frequency while diminishing in amplitude as compared with the wave indicating no vision. The pulse is amplified and the waves of 8 to 12 per second are discriminated against so that no power is supplied to relay 102. However, waves above the order of about 13–35 cycles per second with less amplitude cause the discriminator to feed output through relay 102 closing the switch 103. The closing of switch 103 has the same effect on the recorder as if the patient switch 23 were closed manually.

The discriminator, like the amplifier, has been indicated by way of a block diagram since any suitable discriminator available on the market capable of discriminating between sine waves of 8 to 12 cycles per second and sine waves of less amplitude and greater frequency, for example up to 35 c.p.s., would be satisfactory. It is envisioned that the discriminator will be adjustable so that the test may be set up by the patient closing his eyes and the discriminator adjusted so that relay is not energized. When the patient opens his eyes and light is seen, the discriminator may again be adjusted so that relay 102 actuates. This accommodates variances which may be found in the wide range of patients tested.

When the power from the pulser moves the switch deenergizing the light, the response will go back to no vision and the discriminator will lose its output opening relay 102 by a mechanical return or the equivalent. An example of a discriminator which would perform this function is the Schmitt trigger.

Figure 9A:
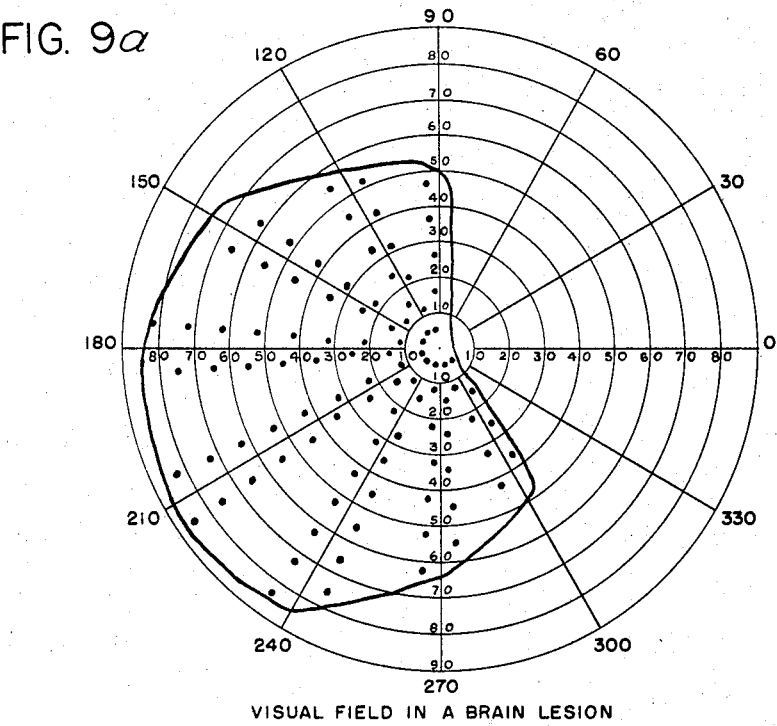
FIG. 9a is a sample chart illustrating the visual field for the left eye in a hypothetical brain lesion.
Figure 9B:
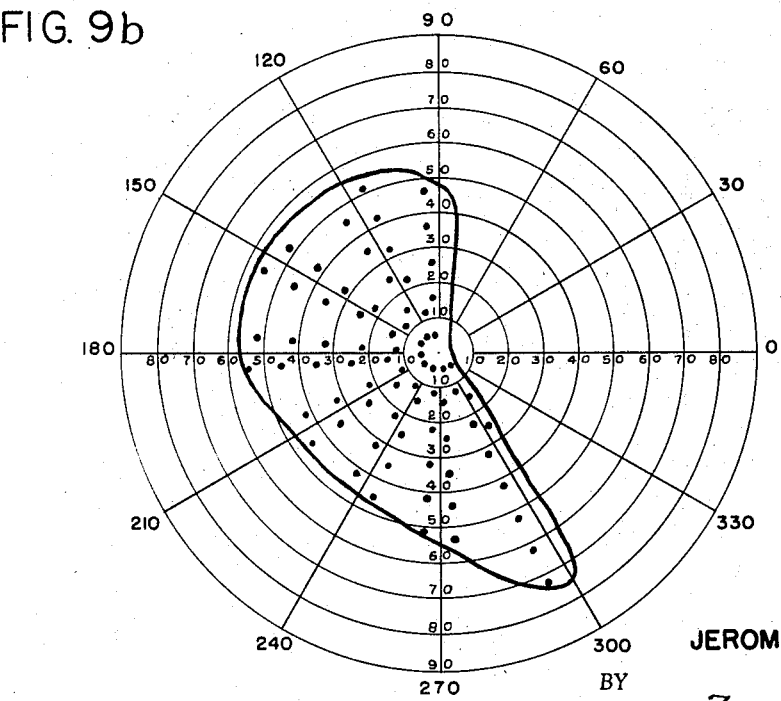
FIG. 9b is a chart similar to the FIG. 9a, however, for the right eye in the same hypothetical brain lesion.

Referring now to FIGS. 9a and 9b, therein are shown sample charts hypothetically a brain lesion. The charts take the form of concentric circles with radii cutting the circle into sectors. The lights would fall on the same relative position on the chart paper as they would on the hemispherical screen if such were flat with the radii approximating the great circles. The samples shown indicate the patient is not able to see with his right or left eye any large segment of a field of vision to the right of the hemisphere. This chart merely illustrates the function of the apparatus and the results would vary for various diseases. A series of dots are presented within the delineated area to show those points wherein the recorder would be activated indicating that the patient sees. The area outside is unmarked indicating that no vision exists in these areas.

Figure 11:
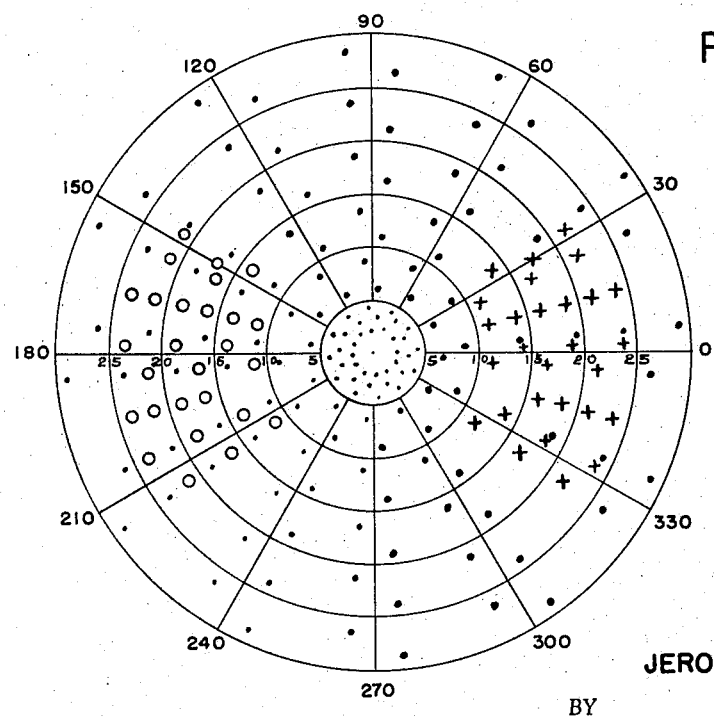
FIG. 11 is a tangent screen chart illustrating the positions where the lights on the tangent screen would be superimposed on the chart, with the lights represented by a cross (+) being checked for the right eye only, the zero (0) being checked for the left eye only, and all of the remaining lights indicated by a solid dot.

The circuit in FIG. 7 is also applicable to the tangent screen shown in FIG. 10 heretofore described. The chart used in connection with the tangent screen is shown in FIG. 11 as the relative points where the lights would fall on the chart. The use of this screen is predicated upon the known medical fact that all persons have a blind spot where the optic nerve enters the eye. Normally, many people are not aware of this fact since the blind spot of the right eye is covered by vision in the left eye and vice versa. The blind spots shown on the chart indicate exactly the position in relation to the macula of their eye where the optic nerve leaves or enters the eye. The need to ascertain the precise size of the optic nerve exists due to the fact it becomes enlarged due to various diseases such as pressure on the brain, glaucoma, venous thrombosis, and the like. When the optic nerve becomes swollen, it casts a larger shadow on the tangent screen, which can be readily measured on employment of the instant device.

The patient is placed one meter from the tangent screen with his eye directed at fixation and the test begun. His responses are recorded in the same fashion as described in connection with FIG. 7. The right eye and the left eye are each tested and the shadow of the optic nerve on the screen at one meter gives an excellent calibration as to the size of the optic nerve where it enters the retina of the eye. Although there will be slight variation between people, the normal optic nerve usually measures about 11 by 15 centimeters on a one meter tangent screen. Obviously, 10 by 14 would be considered normal, as well as a 12 by 16 or 17. However, both of these latter figures are borderline cases. Obviously, if the optic nerve is 15 by 20 centimeters, it is definitely enlarged, indicating a disease of some type and would be regarded as pathological by an experienced ophthalmologist.

It is obvious that with an automated machine which has been programmed under the direction of a skilled ophthalmologist, the testing of perimetric vision through the use of the hemispherical and tangent screens may be conducted by one of lesser training, such as a nurse, intern, aide, or the like, since all that is necessary is for the operator to know how to operate the machine. In this instance, it relieves the ophthalmologist of the manual drudgery connected with perimetric vision tests and allows him to devote his time to the study of the results or other more fruitful endeavors. Further, it is obvious that the use of an automatic machine of this type leaves little or no room for error in the testing of visual fields and therefore enables much more accurate results to be obtained.

The chart of FIG. 11 is one form that may be used with the tangent screen test and is shown with a series of crosses, zeros and solid black dots for convenience of description. The crosses represent the areas on the tangent screen which are tested for the right eye and the areas denoted by circles are those tested for the left eye in order to accurately obtain the size of the optic nerve. The remaining dots are those areas which may be tested for both eyes. In actual practice, the recorder would leave a mark on the chart as heretofore indicated. It is to be understood that each of the dots corresponds to the same relative position on the chart as the lights on the tangent screen and therefore a patient's response would leave a mark where the dots are indicated if the patient sees the light. Where no light is seen, the area is fairly well defined in a generally elliptical pattern with the minor axis slightly below and parallel to the 180° axis on the chart, representing the blind spot caused by the optic nerve entering the eye.

If desired, suitable means such as an infrared light focused on the eye and reflected to a photo cell could be utilized to insure that the patient does not shift the eye while being tested. The reflection from the cornea and sclera of the eye would serve to keep the cell energized keeping a switch in the power supply closed. If the patient shifted his eye from fixation, the switch would open and the test would terminate until the patient's eye was directed to the fixation point.

Although two embodiments are shown, it is obvious that the invention could take varied forms without departure from the concepts embodied herein, and therefore, it is intended that the language employed in describing this invention, as well as the specific embodiments shown, not be limiting inasmuch as such was done in the interest of a more profound understanding of the inventive concepts. It is intended, however, that the scope of the invention be limited to the spirit and scope of the appended claims.

I claim:

1. A visual field tester comprising:
   screen means, including first and second substantially hemispherical bowls, said first hemispherical bowl being rotatably supported relative to said second hemispherical bowl about a common fixation point,
   a plurality of groups of apertures arranged in a zigzag pattern about radial paths on said first hemispherical bowl emanating from said fixation point,
   a plurality of light sources on said second hemispherical bowl arranged in a pattern about radial paths on said second hemispherical bowl emanating from said fixation point corresponding to said zigzag pattern of said plurality of groups of apertures so that a preselected aperture of each of said groups may be aligned with one of said plurality of light sources upon rotation of said first hemispherical bowl,
   means for locating an eye of the patient at an observation point relative to said fixation point,
   switching means for sequentially operating each of said plurality of light sources, said switching means including stepping switch means for successively energizing each of said plurality of light sources according to a predetermined pattern,
   pulse means connected to said switching means for providing energy of predetermined duration for operation of each of said plurality of light sources,
   patient response means for indicating response of the patient to each of said plurality of light sources when visible,
   and means for recording said patient response, connected to said switch means and said patient response means, said recording means being correlated with said switch means so that when a patient responds to the energization of a light source in a given position, the recording means will indicate patient response in said position.

2. The visual field tester as defined in claim 1 wherein a group of apertures comprises apertures of diverse sizes.

3. The visual field tester as defined in claim 1 wherein a group of apertures comprises color selective apertures.

4. The visual field tester as defined in claim 1 wherein said patient response means comprises a patient-operated switch for indicating response by activation of the switch by the patient.

5. The visual field tester as defined in claim 1 wherein said patient response means includes means responsive to the alpha rhythm waves of said patient to automatically record the observation of the patient to the energization of one of said light sources.

6. The visual field tester as defined in claim 5 wherein said alpha rhythm wave responsive means includes circuit means capable of being connected to the head of the patient and means for discriminating alpha rhythm waves of said patient responsive to illumination of said lights.

7. A visual field tester comprising:
   screen means, including a plurality of light sources thereon and a fixation point, said plurality of light sources being placed on said screen means,
   means for positioning an eye of a patient at an observation point relative to said fixation point,
   switching means for individually and sequentially energizing each light source in said plurality of light sources according to a predetermined pattern, said switching means including a first plurality of banks of stepping switches, including means for sequentially activating each of said plurality of banks of stepping switches according to said predetermined pattern,
   pulse means connected to said switching means for providing energy of predetermined duration for illumination of each of said plurality of light sources,
   said energy being provided for said lights at predetermined intervals,
   patient response means for indicating response of the patient to each of said plurality of lights when visible,
   means for recording said patient response, said recording means including a second plurality of banks of stepping switches correlatively operative with said first plurality of stepping switches, connected to said patient response means so that said recording means will indicate response of the patient to energization of each of said light sources in its relative position on said screen means.

8. The visual field tester as defined in claim 7 wherein said switch means includes means for resetting said first and second plurality of stepping switches during the predetermined pattern to restart said pattern when desired.

9. The visual field tester as defined in claim 7 wherein said screen means comprises a tangent screen.

10. The visual field tester as defined in claim 7 wherein said screen means includes first and second substantially hemispherical bowls, said first hemispherical bowl being rotatably supported relative to said second hemispherical bowl about a common fixation point,
   said plurality of light sources being arranged in a zigzag pattern about radial paths of said second hemispherical bowl emanating from said fixation point,
   a plurality of groups of apertures arranged in a corresponding zigzag pattern about radial paths on said first hemispherical bowl emanating from said fixation point, so that a preselected aperture of each of said groups may be aligned with one of said plurality of light sources upon rotation of said first hemispherical bowl.

References Cited

UNITED STATES PATENTS

| 1,115,408 | 10/1914 | De Zeng | 351—23 |
| 1,802,997 | 4/1931 | Yetta | 351—23 |
| 2,564,794 | 8/1951 | Shekels | 351—36 |
| 3,025,755 | 3/1962 | Koetting | 351—30 |
| 3,172,404 | 3/1965 | Copenhaver et al. | 351—24 |

FOREIGN PATENTS 694,128  7/1953  Great Britain.

DAVID H. RUBIN, Primary Examiner.

U.S. Cl. X.R.

351—24